Figures 1, 2:
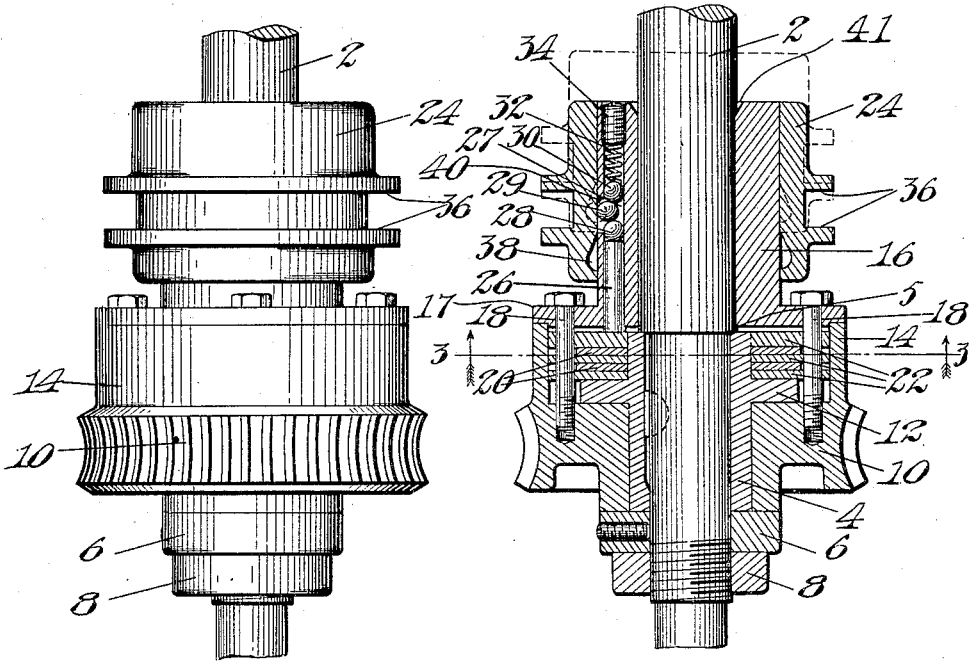

A. WHITE.
CLUTCH.
APPLICATION FILED FEB. 6, 1915.

1,163,386.

Patented Dec. 7, 1915.

WITNESSES
S. P. Marsh
J. H. McCready

INVENTOR
Alfonzo White
By his Attorneys
Putnam Putnam + Bell

UNITED STATES PATENT OFFICE.

ALPHONZO WHITE, OF WORCESTER, MASSACHUSETTS, ASSIGNOR TO THE PEARSONS-ARTER MACHINE COMPANY, OF WORCESTER, MASSACHUSETTS, A CORPORATION OF MASSACHUSETTS.

CLUTCH.

1,163,386.  Specification of Letters Patent.  Patented Dec. 7, 1915.

Application filed February 6, 1915. Serial No. 6,577.

*To all whom it may concern:*

Be it known that I, ALPHONZO WHITE, a citizen of the United States, residing at Worcester, in the county of Worcester and State of Massachusetts, have invented certain new and useful Improvements in Clutches, of which the following description, in connection with the accompanying drawings, is a specification, like reference characters on the drawings indicating like parts in the several figures.

This invention relates to clutches and is especially concerned with the mechanism that effects the relative movement of the clutch parts into or out of operative engagement with each other.

The invention aims to devise a clutch which will be so constructed that it can be manufactured very economically; which shall be compact; in which the wear of the clutch operating parts shall be reduced to a minimum; and which shall be so designed as to prevent the entrance into the clutch or its operating mechanism of dirt or any foreign material.

Figure 3:
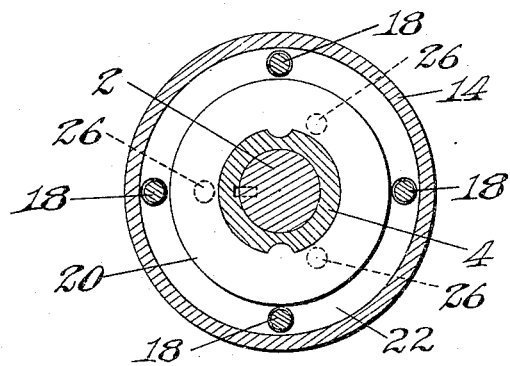

Referring to the drawings: Figure 1 is a side elevation of a clutch constructed in accordance with the invention; Fig. 2 is a vertical, central, sectional view of the clutch shown in Fig. 1; and Fig. 3 is a transverse sectional view taken on the plane indicated by the line 3—3, Fig. 2, and looking in the direction of the arrows.

In the drawings, the driven member, that is, the part that normally is stationary and is driven only when the clutch is in operation, consists of a shaft 2 and a bushing 4 keyed to the shaft and clamped between a shoulder indicated at 5 and a collar 6 fast on the shaft and backed up by a lock nut 8 threaded on the shaft. The driving member consists of a worm gear 10 to which power may be imparted by a worm in the usual manner. The hub of this gear is rotatably mounted on the bushing 4 and has a running fit between the collar 6 and a flange 12 projecting radially from the periphery of the bushing. An annular flange 14, concentric with the shaft, extends from one end of the gear 10 near its periphery and a long bushing 16, freely rotatable on the upper part of the shaft 2, has a radial flange 17 that is seated on the flange 14. A series of bolts 18 extending through the flange 17 are threaded into the hub of the gear 10 and secure the gear and the bushing 16 rigidly together.

The driven device carries a clutch member consisting in the construction shown of a pair of friction disks 20 both keyed to the bushing 4 but free to slide axially of the bushing. The driving member carries a similar clutch part consisting of a set of friction disks 22, three in number, all mounted on the bolts 18 so that they are free to move longitudinally of the shaft but must rotate with the worm gear 10. These disks are located in the space between the gear 10 and the flange 17 and are inclosed circumferentially by the flange 14.

The operative engagement of the two sets of friction disks 20 and 22 necessary to establish a driving connection between the gear 10 and the shaft 2 is effected by pressing all the disks together with sufficient force to keep the driven set of disks 20 from slipping with relation to the driving disks 22. This operation is effected by a controlling sleeve 24 and connections through which the sleeve is enabled to press a series of plungers or pins 26 against the friction disks. In the present construction three such pins are employed, as indicated in Fig. 3, each pin being mounted loosely in a hole 27 drilled in the bushing 16 in a direction parallel to the axis of the shaft 2. The mechanism by which each plunger is operated is best shown in Fig. 2 from which it will be seen that a series of three balls 28, 29 and 30, respectively, each slightly smaller than the hole 27, are positioned in this hole one above the other and just above the pin 26, the lowermost ball 28 resting on the pin. The ball 30 is backed up by a strong helical spring 32 which is positioned in the hole 27 and this spring, in turn, is backed up by a plug 34 that is threaded into the upper end of the hole 27. The controlling sleeve 24 is mounted to slide axially on the outer surface of the bushing 16 and is provided with a guideway 36 in which the ends of a bifurcated controlling lever (not shown) may be positioned to move the sleeve back and forth on the bushing. A slot 40, large enough to permit the free passage of the ball 29, is formed through the outer wall of each hole 27, as shown in Fig. 2, at a point about opposite the position normally occupied by the ball 29. On the inner surface of the sleeve and near its lower end an annular groove 38 is formed of substantially the shape shown in Fig. 2, and of sufficient dimensions to allow the balls 29 to slide partly through the slots 40 and into the groove 38 when it is brought opposite the balls 29. The inner surface of the sleeve 24 at other points fits snugly over the outer surface of the bushing 13. It will now be evident that, when the sleeve 24 is in the dotted line position shown in Fig. 2, with the groove 38 opposite the slots 40 in the bushing 16, the three balls 29 will rest in the groove 38 and, consequently, the friction disks 22 will not be pressed in contact with the disks 20. When, however, the sleeve 24 is moved downwardly, the upper inclined walls of the groove 38 will force the three balls 29 inwardly toward the shaft 2, each ball 29 acting to separate its companions 28 and 30 and thus operating to force its coöperating pin 26 downwardly against the upper disk 22. The pressure of the three springs 32 thus will be applied to the friction disks, each spring operating through one of the sets of balls 28, 29 and 30, and one of the pins 26. This pressure will hold the two sets of disks so firmly together that the friction so produced will keep one set of disks from rotating with reference to the other; and since the two sets of disks are positively connected, respectively, with the shaft 2 and the gear 10, they will force these two parts to rotate together. The pressure of the springs 32 can, of course, be regulated by adjusting the threaded plugs 34 in the holes 27.

When it is desired to interrupt the driving connection between the members 2 and 10, the sleeve 24 is moved upwardly, thus bringing the groove 38 opposite the balls 29 again, at which time the balls will be moved bodily into the groove by the pressure exerted upon them both from above and below, and the springs 32 thus will be rendered inoperative to apply their pressure to the friction disks. Nothing but the weight of the disks themselves, the three pins 26 and the three balls 28 will then be operative to hold the disks together even assuming that the shaft is operated in a vertical position; and the weight of these parts will not be sufficient to produce any substantial frictional resistance of one set of disks to the motion of the other. If the shaft 2 occupies a horizontal position, even the negligible pressure of the pins 26 and balls 28 on the disks will be removed. In either arrangement, when the sleeve 24 is so positioned that the balls 29 lie in the groove 38, the driving set of disks will rotate without exercising any appreciable drag on the driven set of disks and the motion of the shaft 2 will cease.

It will be evident from an inspection of Fig. 2 that the ball 29 will not be forced into exact alinement with its companions 28 and 30 when the sleeve is moved into its downward or operative position but will always be slightly off center with reference to the other two balls when in its effective position. Consequently, the other two balls will at such times tend to move it into the groove 28.

It will be evident from the foregoing description and an inspection of the drawings that most of the parts of this clutch are either standard machine parts or can be turned out automatically on a screw machine and consequently can be manufactured very cheaply. The only parts subject to rapid wear are the disks 20 and 22 which may be punched out of sheet metal at a very small cost and hence can be replaced at a very slight expense. The upper disk 22, against which the pins 26 bear directly, is thicker than the other disks so that it will transmit the pressure of the pins uniformly to the other disks. It should also be noted that the coöperating clutch members and the operating mechanism for them is completely inclosed so that they are protected from dust and dirt. The presence of parts on which a workman's hand or clothing could be caught also is avoided.

Lubricating material may be supplied to the friction surfaces in any convenient manner. When the shaft 2 is run in a vertical position, as shown in the drawings, oil may be dropped into the groove 41 at the upper end of the bushing 16 (see Fig. 2). This oil will work down between the surfaces of the parts 16 and 2, between the friction disks and on to the contacting surfaces of the parts 10, 4, 6 and 12.

It is obvious that, while the invention has been shown and described as applied to a clutch of the disk type, it is equally applicable to clutches of other types, especially the ordinary cone type of clutch. It will also be understood that many changes may be made in the details of construction without departing from the spirit or scope of the invention.

Having thus described my invention, what I claim as new and desire to secure by Letters Patent of the United States is:

1. In a clutch, the combination with driving and driven clutch members mounted for relative movement into or out of clutching relationship to each other, of a movable controlling device, a plurality of rolling members arranged to be moved bodily by said device and means rendered operative by said movement of the rolling members and acting through said rolling members to force said clutch members yieldingly into clutching relationship with each other.

2. In a clutch, the combination with driving and driven clutch members mounted for relative movement into or out of clutching engagement with each other, of a slidable sleeve carried by one of said members, a series of rolling devices arranged to be moved bodily by said sleeve, and devices including spring means arranged to transmit yieldingly the motion of said rolling devices and thereby to effect the relative movement of said clutch members into clutching engagement with each other.

3. In a clutch, the combination with rotary driving and driven clutch members mounted for relative movement into or out of clutching engagement with each other, of a bushing carried by one of said members and having a plurality of holes therein extending parallel to the axis of rotation of said members, devices slidable longitudinally of said holes and operative to effect a relative movement of said clutch members, balls arranged to move said devices, means movable relatively to said bushing for moving said balls and thereby moving said slidable devices, and means coöperating with said balls and said sliding devices to render the action of said devices yielding.

4. In a clutch, the combination with rotary driving and driven clutch members mounted for relative movement into or out of clutching engagement with each other, of a bushing carried by one of said members and having a plurality of holes therein extending parallel to the axis of rotation of said members, a pin slidable in each hole and operative to effect a relative movement of said clutch members, a ball movable laterally into or out of each hole, a sleeve movable relatively to said bushing and having parts arranged to produce an inward movement of each ball, and a spring-pressed device in each hole, each ball being operative on its inward movement to crowd its coöperating pin and said spring-pressed device apart.

5. In a clutch, the combination with a driven shaft, a driving member rotatable with reference to said shaft and coöperating clutch parts rotating, respectively, with said shaft and said driving member and mounted for relative movement into and out of clutching engagement with each other, of a bushing rotatable with the driving member, spring actuated means carried by said bushing, clutch operating means movable with reference to said bushing, a sleeve slidable on said bushing, a plurality of balls arranged to be moved by said sleeve and operative by said movement to render said spring actuated means operative through said clutch actuating means to effect a clutching engagement of said clutch parts.

6. In a clutch, the combination with a driven shaft, a driving member rotatable with reference to said shaft, and coöperating clutch parts carried, respectively, by said shaft and said driving member and mounted for relative movement into and out of clutching engagement with each other, of a bushing rotatable with the driving member, a plurality of pins arranged to bear on one of said clutch parts and mounted in said bushing for movement axially thereof, a plurality of spring actuated devices carried by said bushing, a plurality of balls each mounted for movement between one of said devices and one of said pins to move the pins and cause them to force the clutch parts into clutching engagement with each other, and a sleeve slidable on said bushing and constructed to move said balls and thereby to control the operative engagement of the clutch parts with each other.

7. In a clutch, the combination with rotary driving and driven clutch members mounted for relative movement into or out of clutching engagement with each other, of a bushing carried by one of said members and having a plurality of holes therein extending parallel to the axis of rotation of said members, a pin slidable in each hole near one end thereof, said pins being operative to effect a relative movement of said clutch members into clutching engagement with each other, a spring near the opposite end of each hole, an adjustable plug backing up each spring, a series of balls positioned in each hole between the spring and the pin mounted therein, the wall of each hole being apertured to permit the lateral movement of one of the balls therethrough, and a sleeve slidable on said bushing and recessed to permit one of the balls in each hole to move partly through said aperture when it is in one position but operative to crowd the balls substantially into alinement with each other when it is in another position, whereby the pressure of said springs will be operative through said balls and pins to hold the clutch parts in operative engagement with each other when the balls are substantially in alinement with each other but will be rendered inoperative when the alinement of said balls is interrupted.

In testimony whereof I have affixed my signature, in presence of two witnesses.

ALPHONZO WHITE.

Witnesses:
GERTRUDE M. NICHOLS,
JAY CLARK, Jr.

Copies of this patent may be obtained for five cents each, by addressing the "Commissioner of Patents, Washington, D. C."

It is hereby certified that the name of the assignee in Letters Patent No. 1,163,386, granted December 7, 1915, upon the application of Alphonzo White, of Worcester, Massachusetts, for an improvement in "Clutches," was erroneously written and printed as The Pearsons-Arter Machine Company, whereas it should have been written and printed as *The Persons-Arter Machine Company*, as shown by the records of assignments in this office; and that the said Letters Patent should be read with this correction therein that the same may conform to the record of the case in the Patent Office.

Signed and sealed this 25th day of January, A. D., 1916.

[SEAL.]      R. F. WHITEHEAD,

*Acting Commissioner of Patents.*

Cl. 192—10.